United States Patent [19]
Schlorke

[11] 3,772,642
[45] Nov. 13, 1973

[54] WARNING DEVICE FOR MOTOR VEHICLES

[76] Inventor: Arno Willi Schlorke, Schlorke's Garage (Pty.) Ltd., 355 Potgieter St., Pretoria, Republic of South Africa

[22] Filed: Apr. 7, 1971

[21] Appl. No.: 132,085

[30] Foreign Application Priority Data
    Apr. 24, 1970  South Africa.................... 70/2747

[52] U.S. Cl............. 340/52 F, 180/114, 307/10 AT, 307/10 R, 340/63, 180/103
[51] Int. Cl...................... B60q 5/00, B60r 25/10
[58] Field of Search.................. 340/52 F, 63, 52 D, 340/52 R, 248 Y; 73/117.3, 117.2; 180/114, 103; 307/10 AT, 10 R

[56] References Cited
UNITED STATES PATENTS
2,650,354  8/1953  Joiner, Jr.............................. 340/63
3,172,080  3/1965  Webb et al. ......................... 340/63
3,271,736  9/1966  Brown et al........................ 340/52 F
3,597,729  8/1971  Lopez................................. 340/52 F

*Primary Examiner*—John W. Caldwell
*Assistant Examiner*—Glen R. Swann, III
*Attorney*—Wiviott & Hohenfeldt

[57] ABSTRACT

A sound warning apparatus for motor vehicles to warn by audible alarm of a faulty oil pressure, water temperature, electric generator or of unauthorised entry. One buzzer is parallel connected to existing indicator lights in the vehicle directly but to the generator with a rectifier interposed in series. The rectifier makes it possible to have a single buzzer only, potentially energised by all the causes mentioned, by virtue of the fact that the rectifier prevents a potential short circuit condition arising.

5 Claims, 2 Drawing Figures

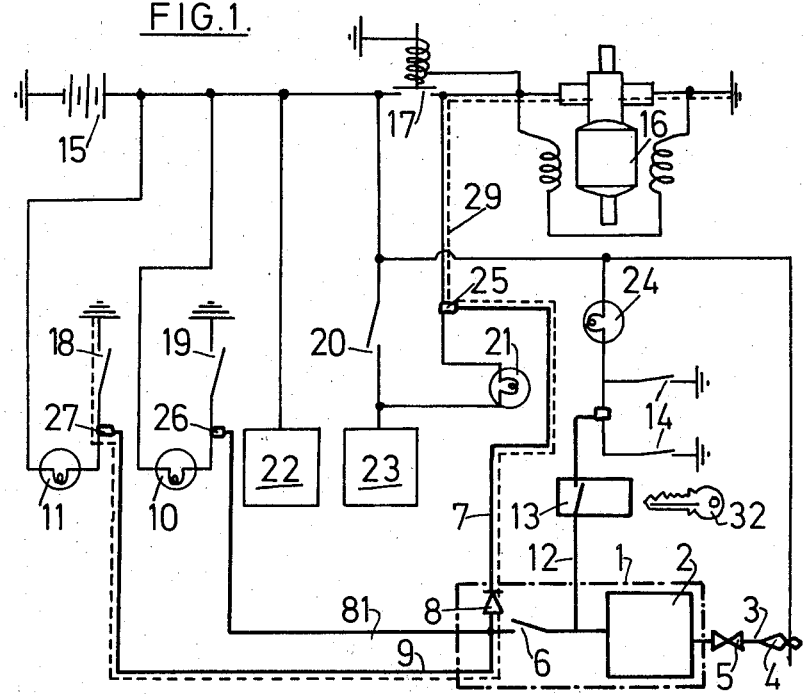
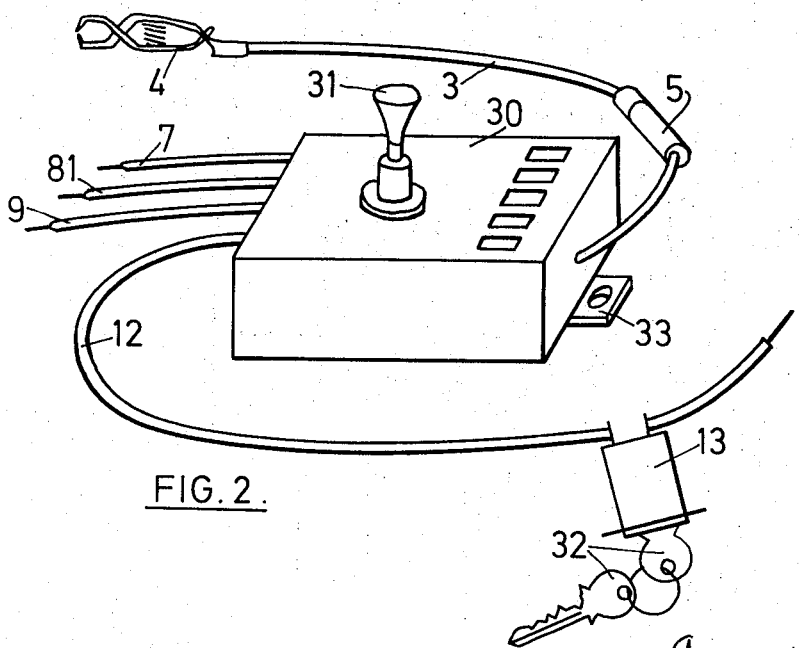

WARNING DEVICE FOR MOTOR VEHICLES

BACKGROUND OF THE INVENTION

This invention relates to a warning apparatus for motor vehicles, more particularly to apparatus for giving a warning of certain operating faults in a motor vehicle engine or auxiliary electric generator. Should such warning apparatus be provided with a single buzzer or other electric energy to sound energy transducer for giving an audible signal of certain faults both in the engine and in the electric generator, a simple electrical circuit for this purpose would give rise to a short circuit of certain electrical connections under certain fault conditions. A short circuit of course may damage electrical components and give rise to a fire hazard. The object of this invention is to provide a solution for this problem.

BRIEF SUMMARY OF THE INVENTION

A warning apparatus for motor vehicles in accordance with this invention, comprises one electrical energy to sound energy transducer, for location where it will be audible (when energised) to a person controlling the vehicle engine, electrical conductors for suitably placing the transducer in electrical connection with an engine auxiliary electric current generator and at least one engine characteristic sensing unit, in which the connection with the generator includes a rectifier in series in suitable sense, the apparatus adapted so that an operating fault in the generator and/or in the engine characteristic(s) monitored by the sensing unit(s) causes the transducer to be energised.

The electrical energy to sound energy transducer may, of course, be the well-known buzzer, or electric bell, diaphragm type loudspeaker, a siren or any other suitably electrically energised article producing sound. The term "rectifier" is used herein to denote any electrical component or circuit which passes current only in one direction and this includes not only vacuum-type rectifiers, but also solid state rectifiers such as diodes; the latter by virtue of their smallness are indeed usually to be preferred.

It is advantageous for the transducer with conductors and rectifier to be provided as an accessory to a vehicle, adapted to be applied to the vehicle, by electrical connection to existing generator and engine characteristics warning lights, or to existing conducting components which are in electrical connection with the lights, advantageously in position at or near the lights. This is convenient because such lights are usually at the dashboard or other position near the driver, and so the transducer may be conveniently located also near the driver and only comparatively short conductors are necessary for its connection.

A further advantage of this invention is that the transducer can, in addition, be provided with electrical conductors for placing the traducer in electrical connection with switches operated by the opening of the vehicle doors, when an outside key-operated switch is closed, so that the transducer is energised when the doors are opened by an unauthorised person. In this way it is able to serve not only as an engine fault warning device, but also as a theft warning device.

It is a further advantage of connecting the conductors of the transducer to the existing engine characteristics warning lights, that when the transducer is energised and gives an audible signal, visual reference to such warning lights may quickly be made and so the particular origin or cause of the signal can quickly be ascertained. In a case where such connection is not made, in accordance with another preferred embodiment of this invention, the apparatus is combined with a plurality of warning lights, adapted so that the cause of the energising of the traducer can be ascertained by reference to the lights of which one will come on when the transducer is energised, that light corresponding to the particular fault. Even in the case where the conductors of the transducer are connected to the existing engine characteristics warning lights, additional warning lights may be suitably electrically connected so that additional causes for energising of the transducer can be indicated.

BRIEF REFERENCE TO DRAWINGS

Further aspects of this invention will be disclosed in the description with reference to the drawing accompanying the specification. In the drawing, a preferred embodiment of the invention is illustrated by way of non-limiting example, in which:

FIG. 1 is a schematic circuit diagram of the apparatus in accordance with a preferred embodiment of this invention, connected to a motor vehicle electrical system, and FIG. 2 is a perspective view of an apparatus in accordance with a preferred embodiment of this invention, incorporating circuitry according to FIG. 1.

DETAILED DESCRIPTION

In FIG. 1 the apparatus provided in accordance with this invention comprises the components located within the box 1, and the conductors 3, 7, 9, 12 and 81, being shown in heavy lines, so as to distinguish from the electrical circuits existing in the motor vehicle which are shown in light lines. In this embodiment, the apparatus comprises a transducer 2, a conductor 3, provided with a crocodile clip 4 for connection to a live point, with a fuse 5 interposed. It further comprises a switch 6 connected to the traducer and to several conductors. The first of these conductors 7 has a rectifier 8 provided in it, and is for connection to the live terminal of the vehicle generator. A second conductor 81 serves for connection to the oil pressure warning light, and a third conductor 9 serves for connection to the water temperature warning light, both warning lights existing on the vehicle and engine. These warning lights are indicated by numerals 10 and 11 respectively. In this embodiment, yet a further conductor 12 is provided connected directly to the transducer (excluding switch 6), with a key operated electrical switch 13 for connection of this conductor to the door-switches 14 existing on the vehicle.

For purposes of this description, the existing motor vehicle electrical system is here illustrated schematically, and only in part, this illustration being adapted for purposes of explanation of the invention. The existing motor vehicle electrical system, may thus be described as follows:

It comprises the usual earthed system with a secondary battery 15 and a generator 16. In this specification the term "live" is generally used as opposed to the earth condition, so as to denote either a positive earth or a negative earth system. In this example a negative earth system is illustrated, and the circuit is marked accordingly. This existing cut-out is indicated herein by 17, and the water temperature warning light is connected to the water temperature sensing device schematically indicated by 18 as a switch which closes onto earth. Similarly the oil pressure warning device is connected to an oil pressure sensing device here schematically indicated by 19 as a switch closing onto earth. In each case the switches are open until the fault condition arises, when they close. In the case of the water temperature, it would be any water temperature above a predetermined maximum, and in case of the oil pressure, it would be any oil pressure below the predetermined minimum. The engine ignition switch is indicated by 20 and the dash-board generator warning light by 21. Other vehicle electrical accessories are indicated schematically by the box 22, and the engine ignition circuitory is indicated schematically by the box 23. The existing door switches 14 are connected to the interior lights 24 existing in the vehicle.

The key control switch 13 will be mounted in the bodywork externally of the car when the apparatus in accordance with this invention is applied to the vehicle, the crocodile clip 4 will be clipped to a live point, and the conductors 7, 81 and 9 connected by suitable connection means 25, 26 and 27 respectively to the generator warning light 21, oil pressure warning light 10, and water temperature warning light 11 respectively. The sense (or in other words, the polarity of connection), of the rectifier 8 is governed by the polarity of electrical system of the vehicle, which in this case as already mentioned is negative earth. It is in this respect that a "suitable sense" must be interpreted: if a positive earth system is used the sense of the rectifier 8 should be reversed from the position shown in FIG. 1.

The use of the apparatus may be described as follows:

The switch 6 is normally left open when the engine is started up (so as to avoid the transducer making a noise as soon as the ignition switch is turned on, and until the engine starts running.) When the engine has been started and is running, the switch 6 is closed, so placing the apparatus into readiness. Switch 6 is located conveniently to hand of the driver for this purpose. In this condition, the generator 16 will normally generate a voltage, resulting in the cut-out 17 closing so that the generator 16 supplies current to charge the battery 15, and to all the vehicle electrical accessories. Supposing that the water temperature rises above a predetermined maximum, the switch 18 will close, and it will be seen that this will immediately provide a path to earth for passage of current from the crocodile clip 4, the fuse 5, through transducer 2, past switch 6, along conductor 9, through the switch 18, and then to earth. Thus this current will energise the transducer and it will provide a warning signal. Simultaneously, of course, the water temperature warning light 11 will be illuminated. If a fault condition arises in the case of oil pressure, precisely corresponding energising of the transducer results. Supposing that the generator 16 for one reason or another fails, (such as burning out, breaking of the generator driving belt, or any other cause) and the voltage normally generated across the generator collapses. In this condition, a path to earth is provided from the crocodile clip 4 through fuse 5 to transducer 2, through switch 6, through rectifier 8, via conductor 7, and connector 25 through the armature of the generator 16 and thus to earth. Thus a current will flow again energising the transducer and giving a warning signal, and again the dash-board generator light 21 will be ignited. The cut-out 17 opens, as usual. The fifth preventive operation of the apparatus is achieved by the driver of the vehicle after having left the vehicle and closed its doors, closing the switch 13 by means of the exterior key. When the doors of the vehicle are closed, the switches 14 remain open, but if the doors are opened, the switches 14 are closed, and again a path for current from clip 4 through fuse 5, transducer 2, conductor 12, switch 13, and switch 14 to earth is provided, so that again the traducer is energised and gives a warning signal. When the owner returns to his vehicle, he will of course open the switch 13 by means of his key before opening the doors, so that the transducer does not give a warning signal when he enters the vehicle. The transducer will similarly be satisfactorily energised in the case of more than one of the components to which it is connected giving rise to a faulty condition.

For the purpose of showing the problem solved by this invention by the introduction of the rectifier 8 we can suppose what would happen if the rectifier 8 were omitted. If a fault condition arose for example at the water temperature and switch 18 closed, a circuit to earth would again be provided for the transducer and again a warning signal would be given. However, under these circumstances a short circuit to earth would be provided across the generator 16 resulting in an extremely heavy current flowing from the generator 16 through connector 25, conductor 7, conductor 9, connector 27, and switch 18 to earth, as indicated by the broken line 29. Since there may be very low resistance in the circuit, the current would be extremely heavy, and may result in a fire danger or burning out of the conductors concerned or burning out of the generator.

As shown in FIG. 2 the apparatus of this invention in a preferred embodiment is provided with the transducer 2, the dash-board switch 6 and the rectifier 8 all located inside a box 30. Operation of the switch 6 is by means of a push-button 31, and the fuse 5 is of the bayonet quick replacement type, with the conductor 3 again leading to the crocodile clip 4. Conductors 7, 81 and 9 are here shown with merely bare ends but could be provided with such connectors as bayonet connectors, or small crocodile clips, or the like. Conductor 12 leads to the switch 13 operatable by keys 32 which must be mounted so as to be accessible from outside the vehicle body. The box 30 is provided for example with lugs 33 for attachment to a suitable position in the vehicle where the transducer will be plainly audible to the driver of the vehicle. The back of the box 30 (not shown here) is advantageously provided with written instructions instructing that the conductor 7 is to be connected to the generator warning light, conductor 8 to the oil pressure warning light, conductor 9 to the water temperature light, conductor 12 to the door switches and crocodile clip 4 to a live point of the vehicle electrical system. The important information that this embodiment is applicable for example to a 6 volt negative earth system, is also printed on the back.

What I claim is:

1. Warning apparatus for a motor vehicle having a battery means, a generator means and a plurality of engine characteristics sensing units, each of said sensing units including switch means constructed and arranged to actuate electric circuit means when the engine characteristic being monitored reaches a certain level, said apparatus comprising:

a converter means for converting electrical energy input into audible sound energy, said converter means having two terminals for the input of electrical energy, and said converter means being constructed and arranged for being located in a position in the vehicle where the sound will be audible to the operator of said vehicle, a first conductor means connected in circuit between a first terminal of said converter means and one of the terminals of said battery, a second conductor means connected in circuit between the second terminal of the converter means and at least one of said engine characteristic sensing units, and a third conductor means connected in circuit between the second terminal of the converter means and said generator and including rectifier means connected in series with said third conductor means and arranged so as to be non-conducting to current flow in said third conductor from said generator to said second conductor when the one of said sensing units is actuated.

2. An apparatus as claimed in claim 1 wherein the vehicle engine characteristic sensing units each include warning lights, said generator is equipped with a warning light and wherein the second conductor means is connected to at least one of the sensing units lights and said third conductor means is connected to the generator warning light.

3. An apparatus as claimed in claim 1 wherein the vehicle is equipped with doors, said apparatus further comprising:
  a. electrical switch means on each door of said vehicle and means for grounding said switch means when the doors of the vehicle are opened,
  b. fourth conductor means connected between the second terminal of said converter means and said door switch means, and
  c. key operated switch means mounted on the exterior of one of said doors and connected in series with said fourth conductor and arranged so as to prevent activation of said converter means through said door operated switches when the key operated switch has been opened by a key.

4. An apparatus as claimed in claim 1, said electrical circuit means including a first warning light means connected in series with said second conductor means and a second warning light means connected in series with said third conductor means, said warning lights being constructed and arranged so as to be visible to the operator of the vehicle.

5. An apparatus as claimed in claim 1 wherein an electrical current on-off switch means is connected in series between said second terminal and a transducer forming part of said converter.

* * * * *